US008661258B2

(12) United States Patent
Hoornaert et al.

(10) Patent No.: US 8,661,258 B2
(45) Date of Patent: Feb. 25, 2014

(54) COMPACT SECURITY DEVICE WITH TRANSACTION RISK LEVEL APPROVAL CAPABILITY

(75) Inventors: Frank Hoornaert, Bertem (BE); Dirk Marien, Ranst (BE)

(73) Assignee: Vasco Data Security, Inc., Oakbrook Terrace, IL (US)

(*) Notice: Subject to any disclaimer, the term of this patent is extended or adjusted under 35 U.S.C. 154(b) by 437 days.

(21) Appl. No.: 12/604,838

(22) Filed: Oct. 23, 2009

(65) Prior Publication Data
US 2011/0099377 A1    Apr. 28, 2011

(51) Int. Cl.
*H04L 9/32* (2006.01)
(52) U.S. Cl.
USPC .......................................................... 713/172
(58) Field of Classification Search
USPC ................ 726/5–7; 713/168, 172; 380/28, 44
See application file for complete search history.

(56) References Cited

U.S. PATENT DOCUMENTS

| | | | |
|---|---|---|---|
| 7,802,104 B2* | 9/2010 | Dickinson et al. | 713/182 |
| 2004/0044739 A1 | 3/2004 | Ziegler | |
| 2007/0125838 A1 | 6/2007 | Law et al. | |
| 2009/0210712 A1 | 8/2009 | Fort | |
| 2009/0235339 A1 | 9/2009 | Mennes et al. | |
| 2010/0142713 A1* | 6/2010 | Perlman | 380/286 |

OTHER PUBLICATIONS

USPTO Final Office Action issued in U.S. Appl. No. 12/619,366 dated Jul. 15, 2013.
Richard E. Smith; Authentication From Passwords to Public Keys; 2001.

* cited by examiner

Primary Examiner — Beemnet Dada
(74) Attorney, Agent, or Firm — RatnerPrestia

(57) ABSTRACT

The present invention relates to the field of securing electronic transactions and more specifically to methods to indicate and verify the approval of the risk level of a transaction and to apparatuses for generating transaction risk level approval codes.
In a method according to the invention transactions are classified into a limited number of categories. A user submitting a transaction to a server is requested to also generate and submit a dynamic transaction category approval code for the submitted transaction. On the server side a corresponding verification value is generated for the received transaction. In an alternative method according to the invention transactions are assigned one of a limited number of risk levels. A user submitting a transaction to a server is requested to also generate and submit a dynamic risk level approval code for the submitted transaction. On the server side a corresponding verification value is generated for the received transaction. The received dynamic risk level approval code is verified on the server side by comparing it with the generated verification value. A security token to secure electronic transactions adapted to generate dynamic transaction category approval codes and a security token to secure electronic transactions adapted to generate dynamic risk level approval codes are also described.

36 Claims, 15 Drawing Sheets

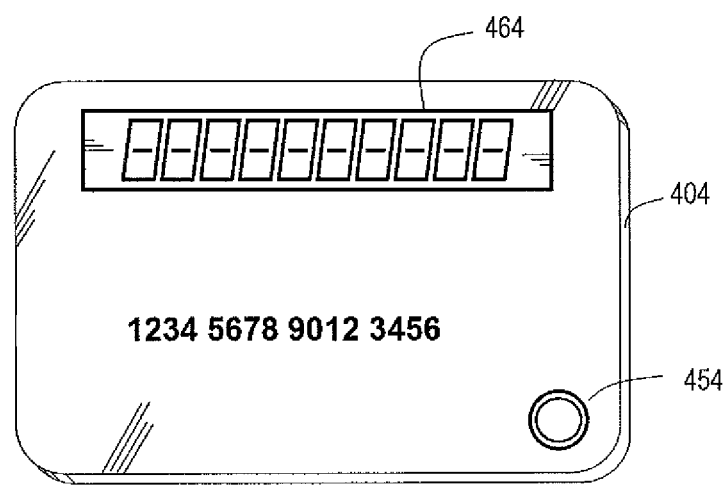

COMPACT SECURITY DEVICE WITH TRANSACTION RISK LEVEL APPROVAL CAPABILITY

TECHNICAL FIELD

The present invention relates to the field of securing electronic transactions and more specifically to methods to indicate and verify the approval of the risk level of a transaction and to apparatuses for generating transaction risk level approval codes.

BACKGROUND ART

Strong authentication tokens are a type of security tokens that are well known in the art. They allow service providers and applications to authenticate the possessor of the token, by providing dynamic passwords that could only be generated with knowledge of a secret or key that is shared between the authentication server employed by the service provider or application on the one hand, and the authentication token on the other hand. To generate dynamic passwords, the strong authentication token applies a cryptographic algorithm to the shared secret and a dynamic variable, for example comprising one or more of a counter value, a value representing the present time, and a random challenge. Usually the dynamic password can only be used once, thus greatly enhancing the level of security with respect to static passwords. Strong authentication tokens are popular, especially to secure applications such as internet banking, because they offer a much higher level of security than static passwords combined with a high user convenience.

Another type of security tokens are transaction signature tokens. Such transaction signature tokens allow service providers and applications to verify the approval of the transaction by the possessor of the token and the integrity of the transaction data, by providing electronic signatures on the transaction that could only be generated with knowledge of a secret or key that is shared between the authentication server employed by the service provider or application on the one hand, and the authentication token on the other hand. To generate electronic signatures, the transaction signature token applies a cryptographic algorithm to the shared secret and the transaction data. In some cases the transaction signature token may also include the value of a dynamic variable into the calculation of the electronic signature as a measure against replay attacks.

To verify the validity of the dynamic password or electronic signature generated by the security token, the authentication server performs the same or a complementary calculation as the security token to obtain a verification value using its own copy of the shared secret, and its locally kept value of the counter, the present time, the challenge it submitted to the end user, or the relevant transaction related data. The server then compares the verification value it generated with the dynamic password or electronic signature received from the user. Authentication or transaction approval is successful if the token-generated dynamic password or electronic signature submitted by the end user matches the verification value generated by the authentication server.

Typical strong authentication and transaction signature tokens have a display for communicating the generated credentials such as one-time passwords or electronic signatures to the end user, and a button or keypad to request the generation of a new credential and/or to enter challenges, transaction data, PIN codes, etc. Other known communicating means include auditory output, USB interfaces, and wireless interfaces. Other known input means include optical sensors, USB interfaces, and wireless interfaces.

Some security tokens require the user to enter a PIN code to perform certain actions such as generating an electronic signature. In some cases the user submits to the authentication server also a static password in addition to the dynamic password generated by a strong authentication token as a counter measure against the fraudulent use of lost or stolen tokens.

Some security tokens are capable of generating both dynamic passwords and electronic signatures.

Some security tokens are dedicated hardware devices whose only or main function is to generate dynamic passwords and electronic signatures, while other tokens are devices having general purpose computing capabilities (for example Personal Computers, Personal Digital Assistants, cell phones) that run software emulating the functions of dedicated hardware strong authentication and transaction signature tokens and that often offer the generation of dynamic passwords and electronic signatures merely as an additional functionality besides other functionalities. The latter kind of token is sometimes referred to as a software token.

In a first class of strong authentication and transaction signature tokens, the secret is embedded in a memory internal to the token itself, which is typically made inaccessible to the outside world. In a second class of strong authentication and transaction signature tokens, the token is capable of receiving an external component carrying a secret, such as a smart card, and of cooperating with this external component to generate and provide dynamic passwords and electronic signatures.

The range of products sold by Vasco Data Security under the brand DIGIPASS contains several examples of security tokens as described above.

DISCLOSURE OF THE INVENTION

Technical Problem

While offering a huge improvement in security when compared to static passwords, the use of dynamic passwords generated by strong authentication tokens doesn't solve all security issues associated with remote electronic transactions. For example, by means of a real-time man-in-the-middle (MITM) attack attackers can get hold of valid dynamic passwords and use them for their own nefarious purposes e.g. to perform fraudulent transactions. In such a MITM attack an attacker may substitute fraudulent transaction data for the real transaction data, for example in the case of a money transfer the attacker may substitute the number for the intended receiving account with the number of an account under control of the attacker and may raise a low amount of money to be transferred to a higher amount of money to be transferred.

Transaction signature tokens offer a solution to this problem since the electronic signatures they generate are mathematically linked to the transaction data they're associated with. If an attacker alters or replaces the authentic transaction data with fraudulent data, the verification of the electronic signature by the verification server will fail. A typical way to provide transaction data to a strong authentication token is by letting the user enter the transaction data manually on the token's keypad. Entering the transaction data on their token's keypad as well as on their client PC can be perceived by some users as too cumbersome. Also, a token capable of generating electronic signatures in general requires a means to input the transaction data. Typically a transaction signature token's input means comprise a keypad, which makes a typical transaction signature token larger than a typical strong authentication token that only generates dynamic passwords and that therefore only needs a minimal user interface (a single button, and sometimes even no button at all, is generally sufficient).

What is needed is a method to secure electronic transactions which offers a superior security level than that offered by dynamic passwords alone, while offering the same user convenience of dynamic passwords, and which can preferably be implemented using security devices that have a form factor that is as compact as that of an ordinary strong authentication token capable of generating dynamic passwords.

Technical Solution

The present invention is based on the insight that a significantly higher level of security than that offered by traditional dynamic passwords can be attained if on the one hand transactions can be classified in a relatively small number of distinct groups each group having a certain level of risk associated with it, and if on the other hand there is a way for the server to unambiguously verify that the user indeed intended to do a transaction with that particular risk level.

One way for users to indicate to the server their intent to carry out a transaction corresponding to a certain risk level is to submit to the server, along with the transaction data, a transaction risk level approval code that corresponds to the risk level of the group the transaction belongs to so that the transaction risk level approval code can be verified by the server.

The present invention is further based on the insight that transaction risk level approval codes can advantageously be generated by a trusted device under control of the user, and that if the number of risk levels is relatively small then such a device requires only a simple user interface to allow a user to indicate with only a few interactions for which risk level a transaction risk level approval needs to be generated.

To improve the security level, the transaction risk level approval codes are preferably unpredictable. Preferably it should be hard for any attacker to obtain or generate valid transaction risk level approval codes for a given transaction. One way of generating unpredictable transaction risk level approval codes involves the use of a cryptographic algorithm parameterized with one or more secret values. Preferably at least one of these secrets is directly or indirectly associated with the user. In one embodiment a secret used in the generation of risk level approval codes is shared with a verification server. The cryptographic algorithm may comprise a symmetric algorithm such as a symmetric encryption or decryption algorithm (for example DES or AES) or it may comprise a one-way function such as a hash function (for example MD5 or members of the SHA family of hash functions). The cryptographic algorithm may also comprise the generation of a message authentication code or a keyed-hash message authentication code. In addition to the risk level for which an approval code is generated, the risk level approval code generation algorithm may also take into account the value of a dynamic variable such as the value of a counter or a time related value in order to prevent replay attacks. In one embodiment the risk level approval code generation comprises applying a cryptographic algorithm to a secret, a dynamic variable, and a value representing the risk level. In another embodiment the risk level approval code generation comprises selecting a secret from a set of secrets based on the risk level and applying a cryptographic algorithm to the selected secret and a dynamic variable. In still another embodiment the risk level approval code generation comprises selecting a cryptographic algorithm from a set of cryptographic algorithms based on the risk level and applying the selected cryptographic algorithm to a secret and a dynamic variable. In yet another embodiment the risk level approval code generation comprises selecting values for one or more parameters from a set of values for these respective parameters based on the risk level and using the selected parameter values when applying a risk level approval code generation algorithm to a secret and a dynamic variable. In one specific embodiment these parameters may include the length of the risk level approval code to be generated or which bits should be selected from a bit string where this bit string may for example include a cryptogram.

A preferred embodiment of the present invention includes a method to secure electronic transactions comprising the steps of:
  defining a limited number of transaction categories;
  defining criteria to classify each possible transaction into one of these transaction categories;
  receiving a transaction from a user;
  applying the criteria above to a received transaction and assigning a received transaction to one of the categories above;
  providing means to a user to generate a proof of their intention to do a transaction belonging to a certain category;
  receiving from a user proof of their intention to do a transaction belonging to a certain category;
  verifying for a received transaction the corresponding proof of the user's intention to do a transaction belonging to the same category as the received transaction.

In some embodiments the transaction categories may have been defined in an implicit way. In other embodiments the criteria to classify transactions may be coded implicitly in an application's program flow.

Another preferred embodiment of the present invention includes a method to secure electronic transactions comprising the steps of:
  storing criteria, for later retrieval, to classify transactions into a limited number of transaction categories
  receiving a transaction from a user;
  applying the criteria above to a received transaction and assigning a received transaction to one of the categories above;
  providing means to a user to generate a proof of their intention to do a transaction belonging to a certain category;
  receiving from a user proof of their intention to do a transaction belonging to a certain category;
  verifying for a received transaction the corresponding proof of the user's intention to do a transaction belonging to the same category as the received transaction.

Preferably the transaction categories are meaningful to the ordinary user, and the criteria to classify the transactions into these categories can be automatically applied by the verification server and can also be easily applied by the ordinary user. Preferably the number of transaction categories or risk levels is at least two and less than six.

In one embodiment the criteria to classify transactions include criteria related to the risk these transactions represent. In another embodiment the criteria to classify transactions include criteria to estimate the susceptibility to fraud of the transactions.

In some embodiments, some steps of the method may be performed by a computer system. This computer system may comprise a server computer. It may also comprise a database and it may also comprise a Hardware Security Module (HSM) to perform certain cryptographic operations.

A specific embodiment of the present invention comprises a method to secure an internet banking application. In this embodiment the classification criteria may comprise the transaction type (examples of transaction types may include: information retrieval such as account balance information, investment operations such as stock trading, money transfers, account configuration such as address information updates). Other classification criteria that may be used include the amount of money involved (for example the amount of money to be transferred or invested) in which case certain thresholds may be defined (for example to distinguish between money transfer transactions with a low and high amount of money to be transferred), or the ownership of the accounts involved in the transaction (for example whether the account to which money should be transferred is owned by the user or is owned by someone else), or the historic pattern of the user's transactions (for example whether the account to which money has to be transferred has already been used before by the user to transfer money to).

In other embodiments other types of applications with other types of transactions may be secured by the present invention. Such applications may include any remotely accessible application and such transactions may include any interaction between a user and the remote system that implies a change in the state of the system. An example of such a system might be a tool such as a firewall whereby the user is an operator of that tool and whereby the transactions include actions to manage the tool. In this example some transactions such as for example monitoring traffic or retrieving statistics may be considered low risk transaction, while other transactions such as for example changing the configuration of the firewall including opening or closing certain ports may be considered high risk transactions.

In a preferred embodiment of the invention a transaction risk level approval code is verified by a validation server using a verification reference value. In one embodiment said verification reference value is generated using the same or a similar algorithm that was used to generate the risk level approval code. In another embodiment the verification reference value is generated using a secret that is directly or indirectly associated with the user or a security device used by the user to generate the risk level approval code. In a specific embodiment this secret is retrieved from a database. In another specific embodiment this secret is generated using a master secret and a value that is directly or indirectly associated with the user or a security device used by the user to generate the risk level approval code. In yet another embodiment the verification reference value is compared with the risk level approval code received from the user, and the risk level approval code is successfully validated if it matches with the verification reference value according to some matching criterion. In a specific embodiment the matching criterion may require that both values are equal.

Another preferred embodiment of the present invention includes a security apparatus for generating transaction risk level approval codes. The security apparatus for generating transaction risk level approval codes preferably has a compact form factor and a simple user interface requiring few user interactions. The user interface preferably comprises input means that allow the user to select the appropriate risk level and to instruct the security apparatus to generate a corresponding risk level approval code. The user interface preferably also comprises output means to communicate for example generated risk level approval codes.

In one embodiment the input means may for example comprise one or more buttons or a thumb wheel. In one particular embodiment the user selects the appropriate risk level by pressing or pushing a specific button or combination of buttons associated with that risk level. In another particular embodiment the user selects the appropriate risk level by scrolling though a list of labels, each label representing a particular risk level. In a specific embodiment the user scrolls through this list by repeatedly pushing a button. In another specific embodiment the user selects the appropriate risk level by quickly pressing a specific button a number of times whereby the number of times that the button has been pressed indicates which risk level the user intends to select. In yet another particular embodiment the user scrolls through the list using a thumb wheel. In still another particular embodiment the user instructs the security apparatus to generate a risk level approval code for a selected risk level by pressing a button or pushing a thumb wheel. In yet another specific embodiment the security apparatus automatically generates a risk level approval code for a currently selected risk level after a certain wait time during which the user doesn't select another risk level.

In another embodiment the security apparatus' user interface comprises output means to communicate a generated risk level approval code to the user or to indicate which risk level is currently selected. These output means may for example comprise a display or means to generate audible signals which may include synthesized speech or recorded voice snippets. In some embodiments the currently selected risk level is indicated using labels. These labels may be numeric or may comprise words. In a specific embodiment these labels may refer directly to the risk level. In another specific embodiment these labels may refer to certain characteristics of the transactions associated with a particular risk level that are easily discernible and meaningful to the user.

In one embodiment the security apparatus has the form factor of a strong authentication token. In another embodiment the security apparatus has the form factor of a credit card.

In one embodiment a secret used in the generation of the risk level approval code is securely stored in the security apparatus. In another embodiment a secret used in the generation of the risk level approval code is stored in a second apparatus that can be accessed by the security apparatus. This second apparatus may for example be a smart card. In yet another embodiment at least a part of the algorithm to generate a risk level approval code is performed by in a second apparatus that can be accessed by the security apparatus. This second apparatus may for example be a smart card.

Advantageous Effects

An important advantage of the present invention is that it can offer a significantly higher level of security than the security offered by the usage of traditional strong authentication tokens generating dynamic passwords (and a fortiori the security level offered by the usage of static passwords), but at a cost and with a level of convenience for the user that is very similar to the cost and convenience of these tokens.

This is illustrated in the following example. A typical internet banking application may support mainly two types of transactions: viewing account information such as the balance and transaction history on the one hand and doing money transfers on the other hand. This application may be secured by static passwords: i.e. users must authenticate themselves before they are allowed to effect a transaction by providing a static password. Practice has shown that static passwords provide a wholly inadequate level of security. Indeed it has been shown time and again that static passwords are much too vulnerable to all kinds of attacks including phishing attacks in which attackers obtain valid passwords which they can subsequently use for fraudulent purposes. The usage of strong authentication tokens that generate dynamic passwords provides a much higher level of security since these dynamic passwords are typically used only once and—in the particular case of time-based tokens—have a very limited validity period. However more sophisticated attacks exist whereby valid one-time passwords are obtained and used almost in real-time within their validity period. An example of such an attack is a Man-In-The-Middle Attack (MITMA) in which an attacker has managed to intercept and manipulate the communications between the user and the application such that the attacker can capture the user's authentication credentials (including any dynamic passwords) and/or can substitute the user's real transaction data with the attacker's fraudulent transaction data. In many cases such a MITMA requires that the user is a bit sloppy in checking e.g. whether the URL of the application's site is correct and whether the SSL/TLS certificate of the site is valid. Unfortunately, users in real life only too frequently behave rather careless and don't notice or ignore anomalies that should alert them that something fishy is going on, or they are gullible enough to be easily convinced to just accept these anomalies and enter their authentication credentials. Once attackers have obtained a valid set of authentication credentials they can perform any transaction that normally only the real user should be entitled to do, e.g. transferring money from the user's account to the attackers' account.

The present invention makes such attacks much less likely to succeed. According to the invention the internet baking application of the example may divide all transactions in three groups each with its own associated level of risk:
   Account viewing transactions: as it is rather unlikely that an attacker may financially benefit at the expense of the legitimate user from such an account viewing transaction, this group of transactions represents a rather low risk.
   Money transfers to a presumably trustable party: such presumably trustable parties may include for example those parties to which the user has already transferred money before or well-known utility companies. As such presumably trustable parties are unlikely to coincide with attackers these transactions may be regarded as medium risk.
   Other money transfers: as fraudulent transactions are likely to be money transfers to an obscure party that is unknown to the legitimate user these transactions are best regarded as high risk.

Legitimate users are provided with small security devices that are capable of generating three types of risk level approval codes: low risk level approval codes, medium risk level approval codes, and high risk level approval codes. When users want to do a transaction the application requires them to provide an appropriate approval code corresponding to the risk level of the transaction.

As a consequence an attacker who has somehow obtained a valid low risk approval code, for example by means of a MITMA attack, can not use that low risk level approval code to inject a fraudulent transaction that has the characteristics of a medium or high risk level transaction. In other words, even if an attacker was successful in mounting a MITMA attack against a certain session, the attacker will in general only be able to use that session to do a fraudulent transaction if the user indeed generates a high risk level approval code. In practice most transactions performed by legitimate users of the internet banking application would be low or medium risk level transactions with the high risk level transactions constituting a relatively small fraction of the total amount of transactions. That means that the success rate of attacks will automatically be significantly reduced since in practice most transaction sessions can no longer be used by attackers as they will not yield a valid high risk level approval code which the attackers need to be able to successfully inject their fraudulent transactions.

The invention also strengthens the security of the application in another way. To mount a successful MITMA attack or otherwise obtain valid authentication credentials, attackers usually have to rely on a certain carelessness by legitimate users when connecting to the application. Such carelessness often stems from the fact that users tend to forget or ignore that even a connection to do an absolutely innocent transaction such as viewing the balance of their account could potentially be hijacked by an attacker for a completely different type of transaction. Also, typical users can not be expected to always be alert for any transaction they want to do. However, typical users are likely to be extra vigilant when doing a high risk level transaction and to pay extra care in verifying that nothing suspicious is going on when they are asked to provide a high risk level approval code. As a result attackers will be much less successful in mounting a MITMA attack against a high risk level transaction session or otherwise obtaining high risk level approval codes.

An extra advantage of the invention is that this higher level of security does not come at the expense of a reduced user convenience. For example in one embodiment the security device to generate the risk level approval codes could have the same form factor of a traditional strong authentication token. The security device could be a small compact device with a display and one button. By pressing the button once the user instructs the device to generate a low risk level approval code. By quickly pressing the button twice the user instructs the device to generate a medium risk level approval code. To instruct the device to generate a high risk level approval code the user quickly presses the button three times. In other words using a device with exactly the same form factor as a traditional strong authentication token and with barely any extra required user interaction, a significantly higher security level can be obtained with respect to the use of traditional strong authentication tokens that only generate dynamic passwords. In another embodiment the security device has three buttons, one for each different risk level. The user instructs the device to generate the appropriate risk level approval code by pressing the corresponding button. In other words using a device with a very similar compact form factor as a traditional strong authentication token and without any extra required user interaction, a significantly higher security level can be obtained with respect to the use of traditional strong authentication tokens that only generate dynamic passwords.

The advantages of the invention become particularly apparent when considering flexible credit card shaped security devices. The technology to produce such devices is not yet mature, requiring costly components and often resulting in yield and reliability problems. In particular the buttons for users to provide input pose problems. In practice it is quite difficult to reliably produce flexible credit card shaped security devices with buttons that are sufficiently responsive to the users' key presses. A relatively large percentage of the buttons turn out to be insufficiently responsive or not responsive at all. That means that the presence of buttons has a negative effect on the yield and/or user convenience of flexible credit card shaped security devices. Every extra button aggravates the problem. As a consequence the production of flexible credit card shaped transaction signature tokens with a numeric keypad typically comprising at least 10 buttons has a very low yield, which in combination with the high component cost makes them prohibitively expensive. However the present invention allows producing flexible credit card shaped risk level approval devices that, while offering a significantly higher security level than traditional strong authentication tokens which only generate dynamic passwords, require only few buttons and user interactions, thus having the same or similar cost as one-button flexible credit card shaped strong authentication tokens and offering the same or a similar level of user convenience.

BRIEF DESCRIPTION OF THE DRAWINGS

FIG. 4c illustrates yet another form factor of a security apparatus to generate risk level approval codes.

MODE(S) FOR CARRYING OUT THE INVENTION

Figure 1A:
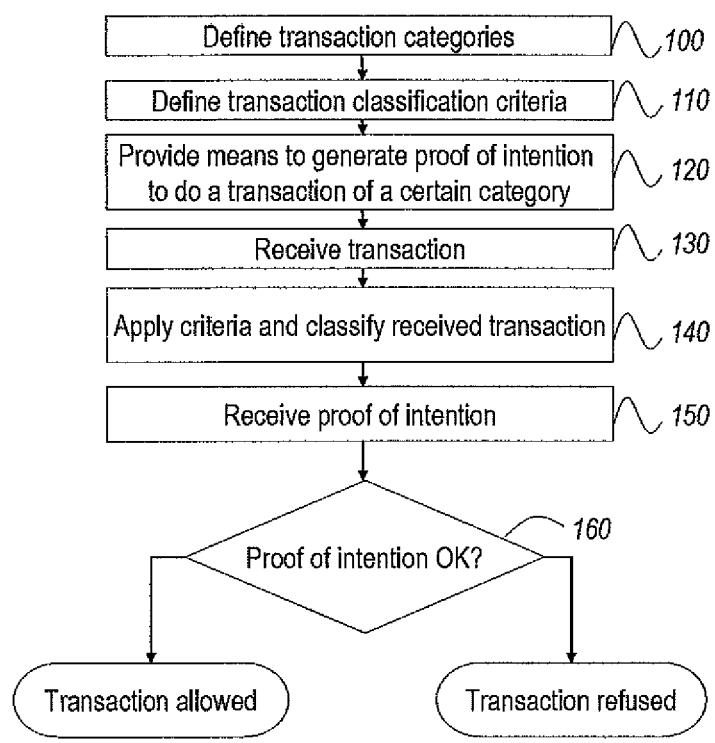
FIG. 1a illustrates a method according to the present invention.

A preferred embodiment of the method of the present invention to secure electronic transactions, as illustrated in FIG. 1a, comprises the steps of:
  defining a limited number of transaction categories (step 100);
  defining criteria to classify each possible transaction into one of these transaction categories (step 110);
  providing means to a user to generate a proof of their intention to do a transaction belonging to a certain category (step 120);
  receiving a transaction from a user (step 130);
  applying the criteria above to a received transaction and assigning a received transaction to one of the categories above (step 140);
  receiving from a user proof of their intention to do a transaction belonging to a certain category (step 150);
  verifying for a received transaction the corresponding proof of the user's intention to do a transaction belonging to the same category as the received transaction (step 160).

Figure 1B:
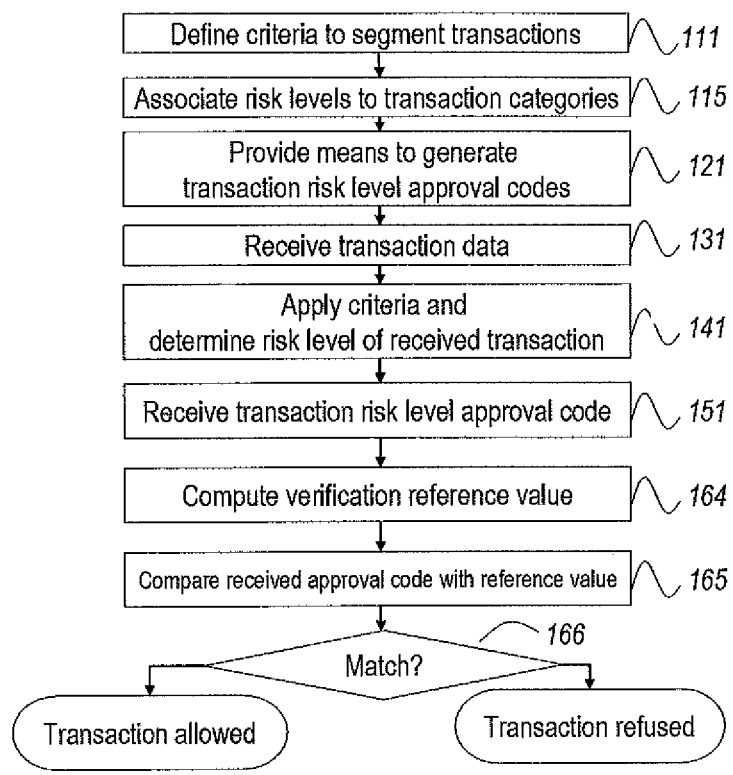
FIG. 1b illustrates another method according to the present invention.

Another embodiment of the method of the present invention to secure electronic transactions, as illustrated in FIG. 1b, comprises the steps of:
  defining criteria to segment transactions into a plurality of categories (step 111);
  associating a risk level with each of these categories (step 115);
  providing users with means to generate transaction risk level approval codes (step 121);
  receiving from users transaction data (step 131);
  applying the defined criteria to the received transactions to determine for the received transactions the corresponding risk levels (step 141);
  receiving from users transaction risk level approval codes associated with transactions (step 151);
  calculating verification reference values for the received transactions on the basis of the determined corresponding risk levels (step 164);
  comparing for the received transactions the received risk level approval codes with the corresponding calculated verification reference values according to some matching criterion (step 165); and
  making an approval of the received transactions dependent on the matching of the corresponding received risk level approval codes with the corresponding calculated verification reference values (step 166).

Figure 1C:
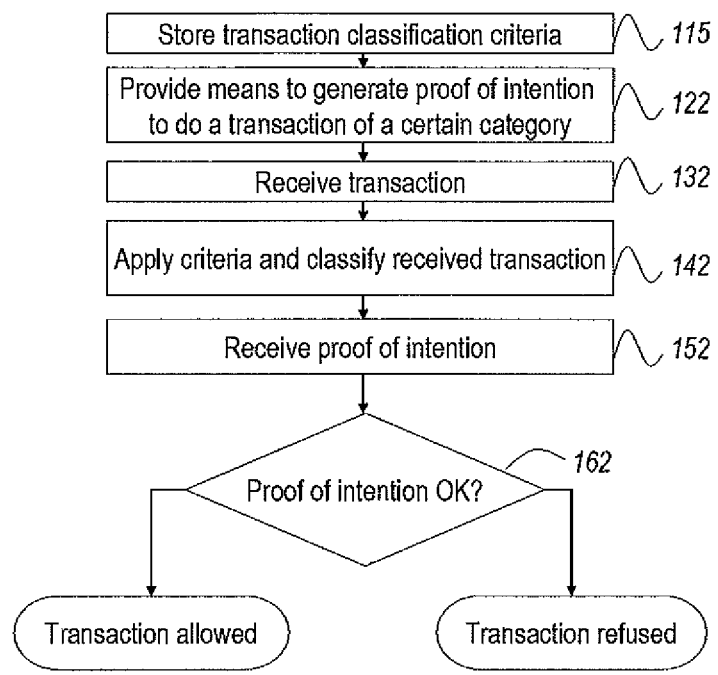
FIG. 1c illustrates yet another method according to the present invention.

Yet another embodiment of the method of the present invention to secure electronic transactions, as illustrated in FIG. 1c, comprises the steps of:
  storing criteria, for later retrieval, to classify transactions into a limited number of transaction categories (step 115);
  providing means to a user to generate a proof of their intention to do a transaction belonging to a certain category (step 122);
  receiving a transaction from a user (step 132);
  applying the criteria above to a received transaction and assigning a received transaction to one of the categories above (step 142);
  receiving from a user proof of their intention to do a transaction belonging to a certain category (step 152);
  verifying for a received transaction the corresponding proof of the user's intention to do a transaction belonging to the same category as the received transaction (step 162).

Figure 1D:
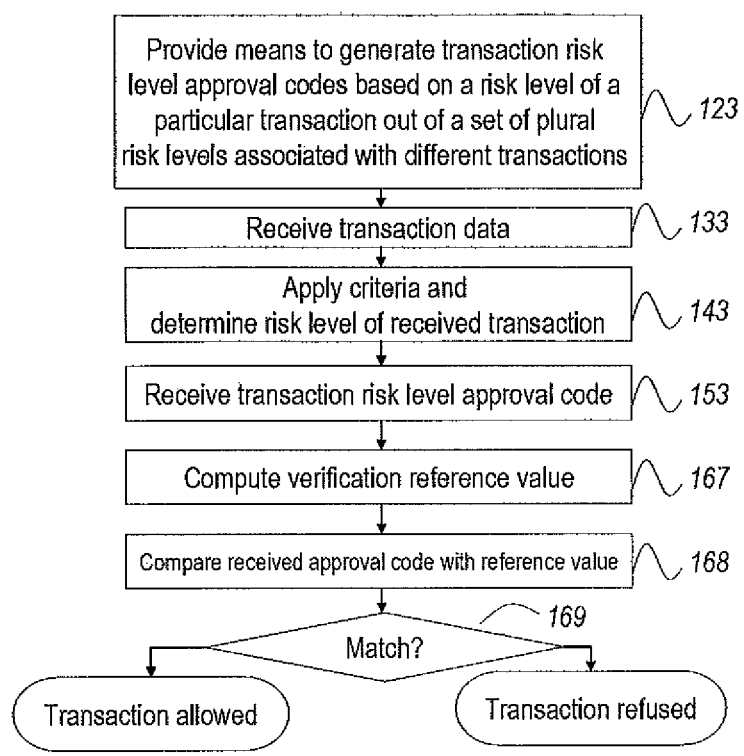
FIG. 1d illustrates still another method according to the present invention.

Still another embodiment of the method of the present invention to secure electronic transactions, as illustrated in FIG. 1d, comprises the steps of:
  providing users with means to generate transaction risk level approval codes based on a risk level of a particular transaction out of a set of plural risk levels associated with different transactions (step 123);
  receiving from users transaction data (step 133);
  applying criteria defining different risk levels to the received transactions to determine for the received transactions the corresponding risk levels (step 143);
  receiving from users transaction risk level approval codes associated with transactions (step 153);
  calculating verification reference values for the received transactions on the basis of the determined corresponding risk levels (step 167);

comparing for the received transactions the received risk level approval codes with the corresponding calculated verification reference values according to some matching criterion (step 168); and making an approval of the received transactions dependent on the matching of the corresponding received risk level approval codes with the corresponding calculated verification reference values (step 169).

In one embodiment of the invention the proof of a user's intention to do a transaction belonging to a certain category comprises a dynamic transaction category approval code. In another embodiment of the invention the proof of a user's intention to do a transaction belonging to a certain category comprises a transaction risk level approval code. In still another embodiment a transaction risk level approval code comprises a dynamic approval code.

Figure 2A:
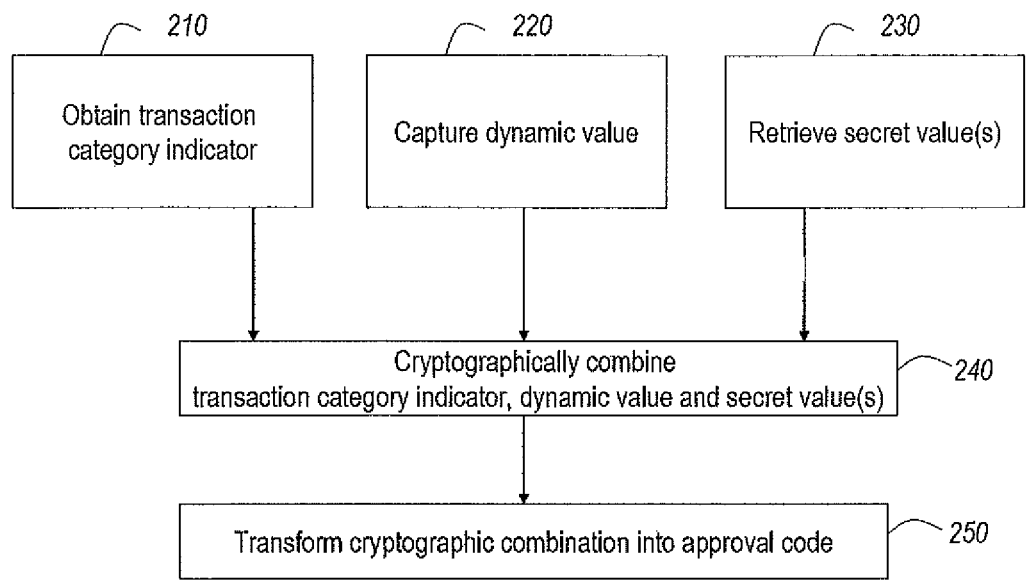
FIG. 2a illustrates a method to generate dynamic transaction category approval codes in accordance with one embodiment of the invention.

FIG. 2a illustrates a preferred method according to the invention to generate dynamic approval codes comprising the steps of:

obtaining an indicator of the transaction category (step 210);

capturing the value of at least one dynamic variable (step 220);

retrieving one or more secret values (step 230);

cryptographically combining said transaction category indicator, said dynamic value and said one or more secret values (step 240); and transforming the result of said cryptographic combination into a dynamic approval code (step 250).

In one embodiment the indicator of the transaction category may comprise a risk level indicator. In another embodiment the dynamic variable may be time related. In a specific embodiment the dynamic variable comprises the value of a real-time clock. In yet another embodiment the dynamic variable comprises the value of a counter. In still another embodiment the cryptographic combination of the indicator, the dynamic value and the one or more secret values comprises the generation of a cryptogram using a mathematical combination of the indicator and the dynamic value and using a cryptographic algorithm that is parameterized with said one or more secret values.

Figure 2B:
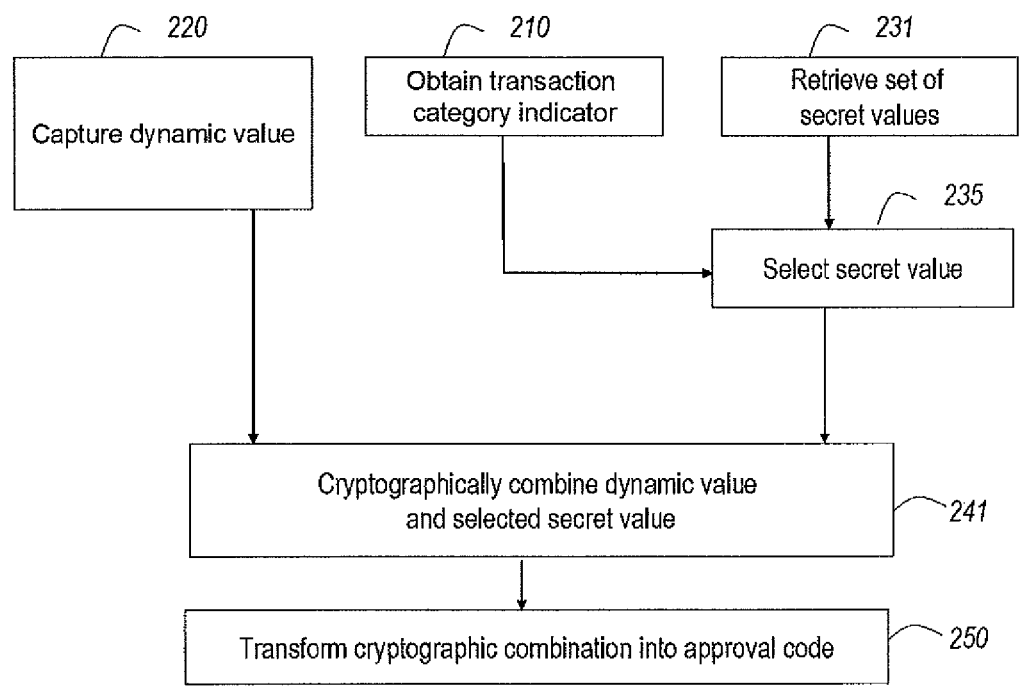
FIG. 2b illustrates an alternative method to generate a risk level approval code in accordance with another embodiment of the invention.

An alternative method according to the invention to generate dynamic approval codes is illustrated in FIG. 2b and comprises the steps of:

obtaining an indicator of the transaction category (step 210);

capturing the value of at least one dynamic variable (step 220);

retrieving a set of secret values (step 231);

selecting at least one secret value out of the retrieved set of secret values on the basis of the value of the indicator of the transaction category (step 235);

cryptographically combining said indicator, said dynamic value and said selected secret value (step 241); and transforming the result of said cryptographic combination into a dynamic approval code (step 250)

Figure 2C:
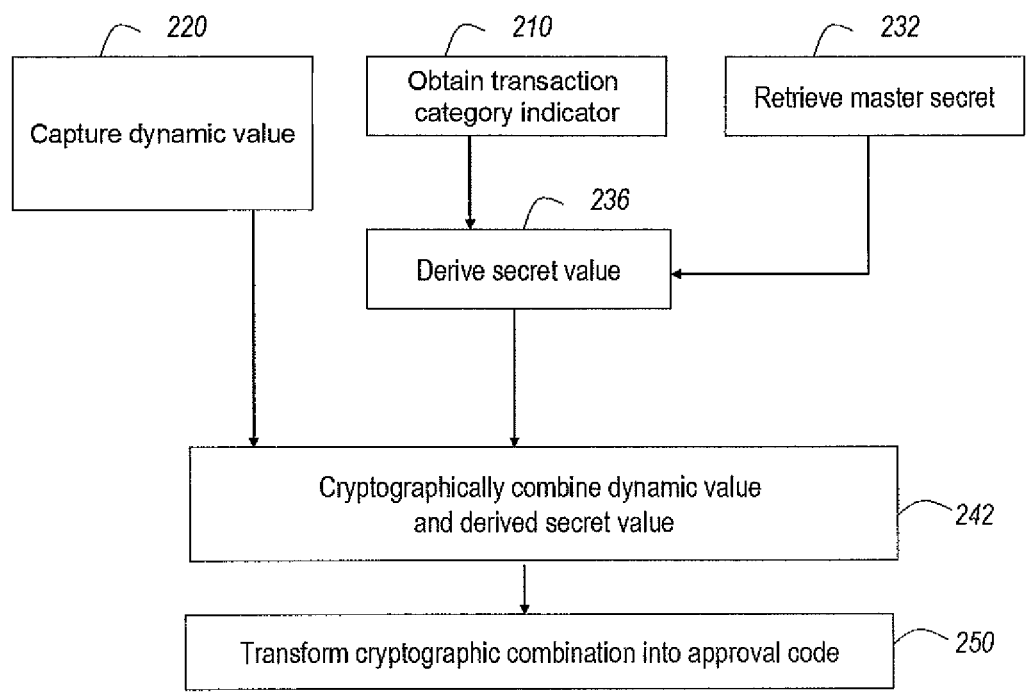
FIG. 2c illustrates another method to generate a risk level approval code in accordance with yet another embodiment of the invention.

Yet another method according to the invention to generate dynamic approval codes is illustrated in FIG. 2c and comprises the steps of:

obtaining an indicator of the transaction category (step 210);

capturing the value of at least one dynamic variable (step 220);

retrieving the value of a master secret (step 232);

deriving a secret value from the retrieved master secret and the indicator of the transaction category (step 236);

cryptographically combining said indicator, said dynamic value and said derived secret value (step 242); and transforming the result of said cryptographic combination into a dynamic approval code (step 250)

In one embodiment the step of deriving a secret value from the retrieved master secret and the transaction category indicator comprises cryptographically combining the master secret and the transaction category indicator. In a specific embodiment the cryptographically combining comprises using an encryption or decryption algorithm acting on data related to the transaction category indicator and parameterized with the master secret. In another specific embodiment cryptographically combining comprises hashing data related to the transaction category indicator and the master secret.

In one embodiment the means to generate transaction risk level approval codes comprise a security apparatus. A security apparatus to generate risk level approval codes is often provided in the form of a handheld, battery-powered apparatus with output means such as a display to convey approval codes and other information to the user. Often, the apparatus has one or more buttons or other input means to trigger the transaction risk level approval code generation and/or to select the appropriate risk level for which an approval code should be generated.

Figure 3A:
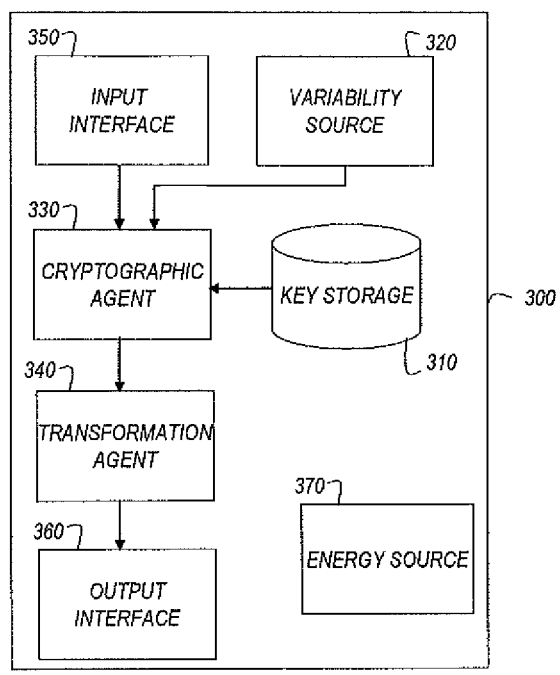
FIG. 3a illustrates a security apparatus to generate risk level approval codes in accordance with one embodiment of the invention.

In a preferred embodiment of the apparatus of the present invention, as illustrated in FIG. 3a, the apparatus is a security token 300 to generate dynamic transaction category approval codes. The security token 300 typically comprises a secret key storage 310, a variability source 320, a cryptographic agent 330, a transformation agent 340, an input interface 350, an output interface 360, and an energy source 370.

The secret key storage 310 stores one or more secret keys—preferably in a secure way—that may be used in the generation of dynamic approval codes. The secret key storage 310 may comprise volatile memory, such as the memory of a processor or microcontroller already present in the token, or a separate random access memory (RAM) component, whereby this memory is permanently powered by a battery to prevent loss of the stored data. Alternatively, the secret key storage 310 may be persistent memory such as a flash memory component.

Variability source 320 provides a dynamic variable which may comprise a time-related value or a counter value. Variability source 320 may comprise a real-time clock or a counter. The counter may be automatically incremented each time that a dynamic approval code is generated.

Cryptographic agent 330 may be an appropriately programmed processor or microcontroller, or dedicated hardware such as an Application-Specific Integrated Circuit (ASIC) or Field-Programmable Gate Array (FPGA).

Also the transformation agent 340 may be an appropriately programmed processor or microcontroller, or dedicated hardware such as an Application-Specific Integrated Circuit (ASIC) or Field-Programmable Gate Array (FPGA).

The cryptographic agent 330 and the transformation agent 340 may be implemented on the same hardware platform or on a different hardware platform.

Input interface 350, which may comprise a human interface device or a machine-to-machine interface, allows the user to instruct the token to generate a dynamic approval code or to select a transaction category or a risk level for which a dynamic approval code should be generated. The human interface device may comprise one or more buttons. The human interface input device may also or alternatively comprise a thumb wheel.

Generated dynamic approval codes may be provided to the end user through output interface 360. In another embodiment the token includes an approval code output interface 360, such as a human interface device or a machine-to-machine interface, adapted to output a generated dynamic approval code. The human interface output device may comprise a visual output device, such as a display, or an audible output device, such as a source of synthesized speech. The dynamic approval code that is output by the human interface output device may be communicated to the user as a string or sequence of human-interpretable symbols.

The machine-to-machine interface of input interface 350 or output interface 360 may comprise a USB, Ethernet, serial, or other wired interface, or a Bluetooth, WiFi, cellular or other wireless interface.

Energy source 370 provides the energy required by the other components. Energy source 370 may comprise a battery, a photo-voltaic cell, a fuel cell, a thermo-electric element, an agent adapted to scavenge ambient energy, or any other energy source that is compatible with the energy requirements of the other components and the overall cost and form factor requirements of security token 300.

The security token 300 typically operates as follows. By means of the input interface 350 the user selects an appropriate transaction category or risk level and instructs the token to generate a corresponding dynamic approval code. Cryptographic agent 330 cryptographically combines one or more keys retrieved from secret key storage 310 with the value of a dynamic variable provided by variability source 320 and an indicator of the transaction category or risk level selected by the user through input interface 350. Transformation agent 340 transforms the result of the cryptographic combination into a dynamic approval code. The token outputs the generated dynamic approval code by means of output interface 360.

In one embodiment these components are arranged on a substrate such as a PCB. In another embodiment these components are housed in a protective shell which may be of plastic. In yet another embodiment these components are embedded in a laminated medium.

Figure 3B:
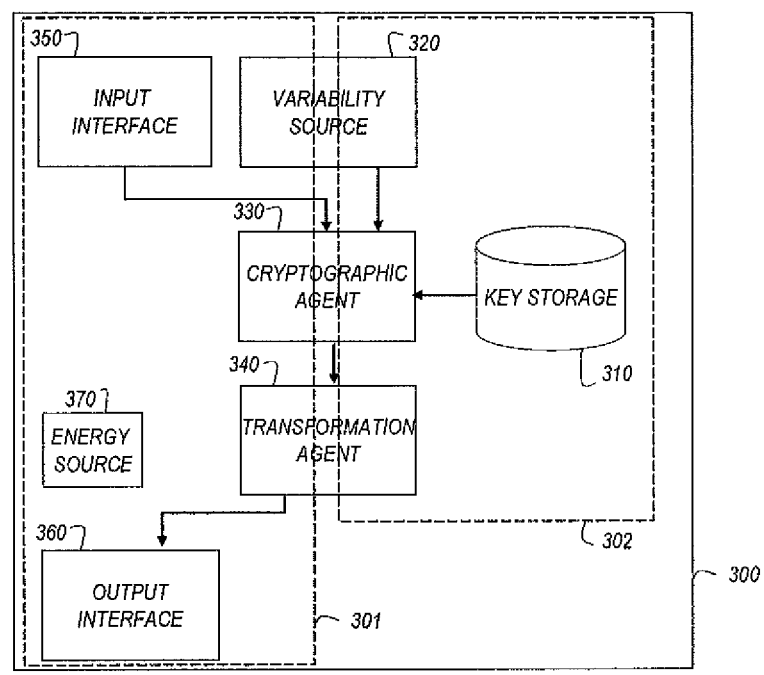
FIG. 3b illustrates another security apparatus to generate risk level approval codes in accordance with one embodiment of the invention.
Figure 3C:
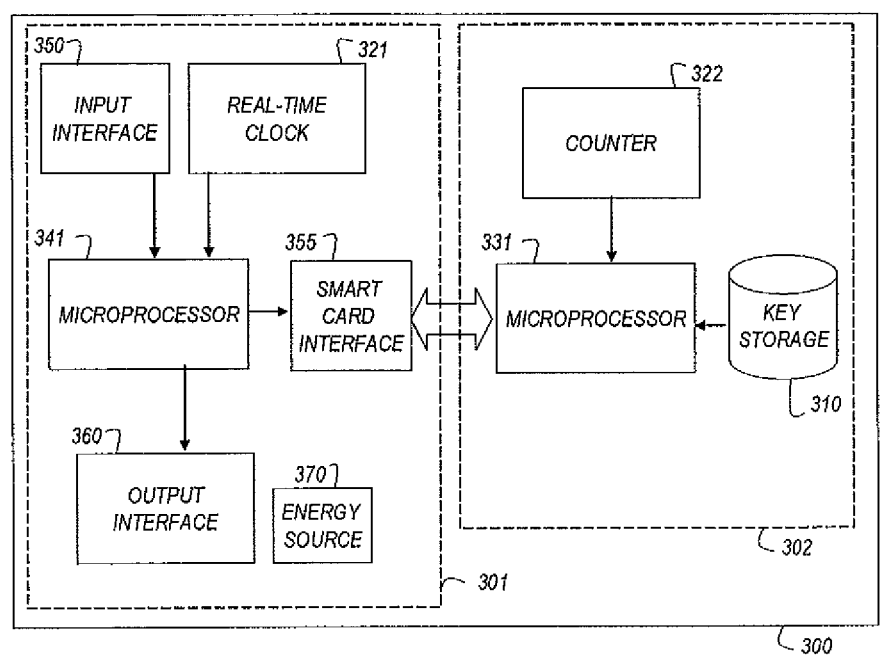
FIG. 3c illustrates yet another security apparatus to generate risk level approval codes in accordance with one embodiment of the invention.

In still another embodiment, as illustrated in FIG. 3*b* some of these components may be incorporated in one physical device (301) while other components may be incorporated in a second device (302) whereby the dynamic transaction category approval codes are generated by the two devices together in close co-operation. Some of these components may be divided over both devices. For example, the first device (301) may comprise a first part of the cryptographic agent 330 while the second device (302) may comprise a second part of the cryptographic agent 330. The same may be true for the transforming agent 340 or the variability source 320. In a particular embodiment, as illustrated in FIG. 3*c*, the first device (301) may comprise an unconnected smart card reader powered by a battery (370), with an output interface (360) comprising a display, an input interface (350) comprising a button, a real-time clock (321) providing a time related value, a microprocessor (341) for performing cryptographic and/or transformation operations and a smart card interface (355) to communicate with an inserted smart card; while the second device (302) may be a smart card that comprises a secret storage (310), a microprocessor (331) for cryptographic operations and a counter (322) to provide a counter value. For example, an unconnected smart card reader and an inserted smart card may together generate a dynamic approval code as follows. By means of one or more buttons on the reader the user selects a transaction category or a risk level and instructs the reader to generate a dynamic approval code for the selected transaction category or risk level. The reader communicates with the inserted smart card over the smart card interface by means of smart card commands. With these smart card commands the reader communicates a value representing the selected transaction category or risk level to the smart card and instructs the smart card to generate a cryptogram using that value. The cryptographic processor of the smart card generates a cryptogram using a the received value representing the selected transaction category or risk level, a counter that it maintains and that it automatically increments each time that it generates a cryptogram, and a secret key that it stores in its secure non-volatile memory. The smart card sends the generated cryptogram and the counter value that was used back to the reader. The reader's microprocessor selects a group of bits of the cryptogram and the counter value and transforms the resulting bit string into a sequence of decimal digits or a sequence of other human interpretable symbols. The reader outputs this sequence of digits or other symbols on its display. In a variant of this embodiment the smart card merely stores a secret value and returns a secret key to the reader and the processor of the reader generates the cryptogram.

Figure 4A:
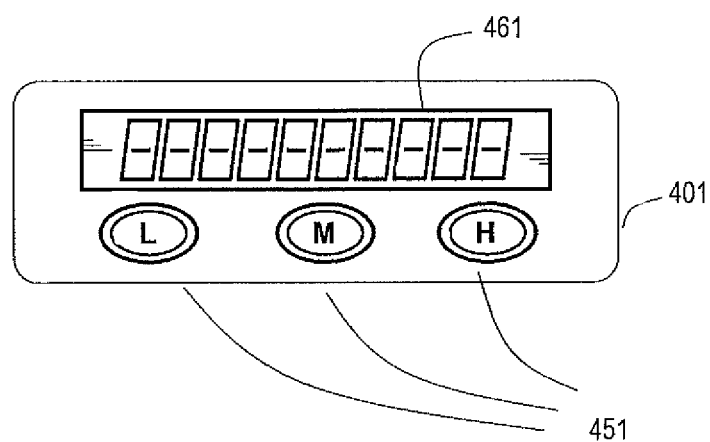
FIG. 4a illustrates a particular form factor of a security apparatus to generate risk level approval codes.

FIG. 4*a* illustrates a particular embodiment of a security apparatus according to the invention comprising a token 401 to generate dynamic approval codes. Its output interface comprises a display 461. Its input interface comprises a number of buttons 451, one for each different transaction category or risk level. In the illustrated example the token has three buttons because it supports the generation of dynamic approval codes for three different transaction categories or transaction risk levels. A label or symbol indicating the corresponding transaction category or risk level may be printed on the token's plastic housing close to each button or the buttons themselves. When the user presses a button the token powers on, generates a dynamic approval code for the selected transaction category or risk level and outputs the generated dynamic approval code on its display.

Figure 4B:
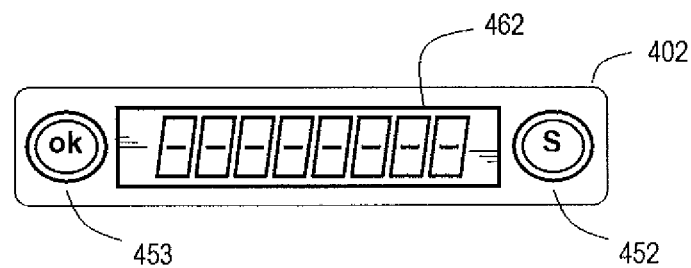
FIG. 4b illustrates another form factor of a security apparatus to generate risk level approval codes.

FIG. 4*b* illustrates another particular embodiment of a security apparatus according to the invention comprising a token 402 to generate dynamic approval codes. Its output interface comprises a display 462. Its input interface comprises two buttons 452/453. One button 452 allows the user to cycle through a list of supported transaction categories or risk levels. When the user presses this button the token selects the following transaction category or risk level. The token indicates which transaction category or risk level is currently selected by means of an appropriate label or symbol that is displayed on the display 462. These labels may for example include "low", "medium", "high", or "log-in", "pay", "pay high". If the user presses the other button 453 the token generates a dynamic approval code for the currently selected transaction category code or risk level and outputs this generated dynamic approval code on its display 462.

FIG. 4*c* illustrates yet another particular embodiment of a security apparatus according to the invention comprising a token 404 to generate dynamic approval codes which has the form factor of a credit card. Its output interface comprises a display 464. Its input interface comprises a button 454. If the user presses the button at least once the token is powered on. The number of times that the button 454 has been pressed determines which transaction category or risk level is currently selected. For example by pressing the button 454 quickly two times, the second transaction category, or risk level of list of supported transaction category or risk level is selected. To select the third transaction category or risk level of the list the user quickly presses the button 454 three times. The token indicates which transaction category or risk level is currently selected by means of an appropriate label or symbol that is displayed on the display 464. If the user doesn't press the button 454 for more than a certain prefixed time, for example 2 seconds, then the token generates a dynamic approval code for the currently selected transaction category code or risk level and outputs this generated dynamic approval code on its display 464. If however the user presses the button 454 within that prefixed time another transaction category or risk level is selected.

Figure 4D:
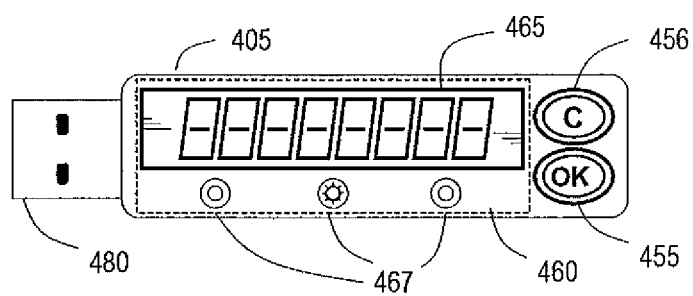
FIG. 4d illustrates still another form factor of a security apparatus to generate risk level approval codes.

FIG. 4*d* illustrates yet another particular embodiment of a security apparatus according to the invention comprising a token 405 to generate dynamic approval codes. The token 405 comprises an output and an input interface. Its output interface 460 may comprise a set of LEDs 467. It may also or alternatively comprise a display 465. Its input interface comprises a button 455. The token 405 furthermore comprises machine-to-machine communication interface 480 which may for example comprise a USB connector and a USB controller. When the token 405 is connected to a host computer by means of this machine-to-machine communication interface, an application on the host computer may request the token 405 to generate a dynamic approval code for a transaction category or risk level provided by the host computer. By means of the output interface 460 the token 405 indicates to the user for which transaction category or risk level a dynamic approval code is requested. For example, the token may turn on a specific LED that is associated with the given transaction category or risk level, or it may show a certain label or symbol on the display 465. By pressing the button 455 the user instructs the token 405 to generate the requested approval code. The token 405 then generates the requested dynamic approval code and communicates it to the host through communication interface 480. The token 405 may also comprise another button 456 which the user can press to indicate that the host computer's request must be refused.

Figure 4E:
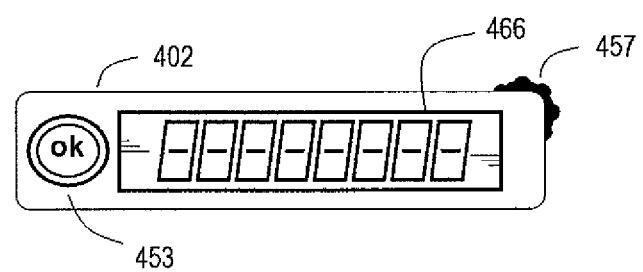
FIG. 4e illustrates one more form factor of a security apparatus to generate risk level approval codes.

FIG. 4*e* illustrates one more particular embodiment of a security apparatus according to the invention comprising a token 402 to generate dynamic approval codes. Its output interface comprises a display 466. Its input interface comprises a thumb wheel 457. In one embodiment its input interface may also comprise a button 453. By turning thumb wheel 457 the user can cycle through a list of supported transaction categories or risk levels. The token indicates which transaction category or risk level is currently selected by means of an appropriate label or symbol that is displayed on the display 466. These labels may for example include "low", "medium", "high", or "log-in", "pay", "pay high". In one embodiment the user instructs the token to generate a dynamic approval code for the currently selected transaction category code or risk level by pressing the thumb wheel. In another embodiment the user presses the button 453 to do this. The token outputs the generated dynamic approval code on its display 466.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A method to secure electronic transactions comprising the steps of:
   storing, by at least on server, criteria to classify transactions into a plurality of transaction categories;
   receiving, by the at least one server, a particular electronic transaction submitted by a user, the particular electronic transaction including transaction information;
   receiving, by the at least one server, a dynamic transaction category approval code indicating a proof of intention of the user to perform a transaction belonging to a user selected transaction category;
   applying, by the at least one server, said criteria to the transaction information and assigning said received particular electronic transaction to a particular one of said plurality of transaction categories based on said criteria;
   verifying, by the at least one server, whether the received dynamic transaction category approval code is valid for the transaction category that said received particular electronic transaction was assigned to by the at least one server to determine whether the received particular electronic transaction should be executed or denied.

2. The method of claim 1 further comprising generating, by the at least one server, a verification reference value for the transaction category that said received particular electronic transaction was assigned to; and
   wherein said at least one server compares said dynamic transaction category approval code with said verification reference value to determine whether to execute or deny the transaction.

3. The method of claim 2
   wherein the method further comprises the step of determining, by the at least one a second transaction category indicator that is indicative of the category of said received transaction; and
   wherein said generating of the verification reference value comprises cryptographically combining, by the at least one server, the second transaction category indicator indicative of the category of said received transaction, a second dynamic value and a second verification secret value.

4. The method of claim 2 further comprising associating, by the at least one server, at least one of a finite set of discrete risk levels with each of said transaction categories; wherein said dynamic transaction category approval code indicates a proof of said user's intention to do a transaction having a particular one of said risk levels; wherein the dynamic transaction category approval code is a dynamic risk level approval code and the first transaction category indicator comprises a first risk level indicator indicative of the risk level of the transaction that the user intends to do; wherein the method further comprises the step of determining, by the at least one server, a second risk level indicator that is indicative of the risk level of the received transaction; and wherein said generating of the verification reference value comprises cryptographically combining, by the at least one server, the second risk level indicator indicative of the risk level of said received transaction, a second dynamic value and a second verification secret value.

5. A method to generate, by a user operated authentication token, a dynamic transaction category approval code indicating proof of intention by the user to perform a transaction of a particular transaction category, the method comprising the steps of:
   obtaining, by the authentication token from the user, a transaction category indicator, the transaction category indicator indicating a particular transaction category selected by the user based on parameters of a transaction that the user intends to execute;
   capturing, by the authentication token, the value of at least one dynamic variable;
   retrieving, by the authentication token, one or more secret values;
   applying an algorithm, by the authentication token, to generate a dynamic transaction category approval code using said selected transaction category indicator indicating the particular transaction category of the transaction that the user intends to perform, said dynamic variable value and said one or more secret values;

wherein said algorithm comprises the steps of determining with said retrieved one or more secret values a cryptographic secret key, cryptographically combining at least said dynamic variable value and said cryptographic secret key, and transforming the result of said cryptographic combination into the dynamic transaction category approval code.

6. The method of claim 5 wherein said determining of a cryptographic secret key comprises selecting a cryptographic secret key out of said secret values on the basis of the value of said transaction category indicator.

7. The method of claim 5 wherein said retrieving one or more secret values comprises retrieving the value of a master secret and wherein said determining of a cryptographic secret key comprises deriving a cryptographic secret key from said value of said master key using the value of said transaction category indicator.

8. The method of claim 5 wherein said transaction category indicator comprises a risk level indicator.

9. The method of claim 5 wherein said dynamic variable is time related.

10. The method of claim 9 wherein said dynamic variable value comprises the value of a real-time clock.

11. The method of claim 5 wherein said dynamic variable value comprises the value of a counter.

12. The method of claim 5 wherein said cryptographically combining of said dynamic variable value and said cryptographic secret key comprises generating a cryptogram using a mathematical combination of said dynamic variable value and said transaction category indicator and using a cryptographic algorithm that is parameterized with said cryptographic secret key.

13. An apparatus to secure electronic transactions adapted to generate dynamic approval codes indicating proof of intention by the user to perform a transaction of a particular transaction category, the apparatus comprising;

a secret key storage for storing one or more secret values,
a variability source for providing a dynamic variable value,
an input interface adapted to enable selection by a user of a value of a transaction category indicator or risk level indicator from a limited set of supported transaction category or risk level indicator values, the value indicating a particular transaction category or risk level of the transaction selected by the user based on parameters of the transaction that the user intends to perform,
a cryptographic agent adapted to cryptographically combine a secret key related to at least one or more secret values stored in said secret key storage with said dynamic variable value and said transaction category or risk level indicator selection value indicating the particular transaction category or risk level of the transaction that the user intends to perform,
a transformation agent for transforming the result of said cryptographic combination into a dynamic approval code, and an output interface to provide said dynamic approval code to the user.

14. The apparatus of claim 13 wherein said variability source comprises a real-time clock.

15. The apparatus of claim 13 wherein said variability source comprises a counter.

16. The apparatus of claim 13 wherein said input interface comprises a machine-to-machine interface and wherein said selection of a value of a transaction category indicator or risk level indicator comprises processing data received through said machine-to-machine interface.

17. The apparatus of claim 13 wherein said input interface comprises a human interface device and wherein said selection of a value of a transaction category indicator or risk level indicator comprises the user interacting with said human interface device.

18. The apparatus of claim 17 wherein said human interface device comprises one or more buttons and wherein said user interacting with said human interface device comprises using at least one of said buttons.

19. The apparatus of claim 17 wherein said human interface device comprises at thumb wheel and wherein said user interacting with said human interface device comprises using said thumb wheel.

20. The apparatus of claim 13 which comprises a first device powered by an energy source contained within the first device and including said input interface and output interface and a second device including said secret key storage; said second device further including input and output devices for receiving and forwarding signals from and to said first device, said first device further including input and output devices for receiving and forwarding signals to said second device.

21. The apparatus of claim 20 wherein said first device comprises at least a part of said transformation agent.

22. The apparatus of claim 20 wherein said first device comprises at least a part of said cryptographic agent.

23. The apparatus of claim 20 wherein said first device comprises at least a part of said variability source.

24. The apparatus of claim 20 wherein said second device comprises at least a part of said transformation agent.

25. The apparatus of claim 20 wherein said second device comprises at least a part of said cryptographic agent.

26. The apparatus of claim 20 wherein said second device comprises at least a part of said variability source.

27. The apparatus of claim 20 wherein said second device comprises a smart card and input and output devices of said first device comprise a smart card interface.

28. The apparatus of any of claim 13, 14, 15, 17 or 18 having a credit card form factor.

29. The method of claim 3:
wherein said first generation secret value is shared with a verification server;
wherein a symmetric cryptographic algorithm is used to generate the dynamic transaction category approval code by cryptographically combining said first transaction category indicator, said first dynamic value and said first generation secret value; and
wherein another algorithm is used to generate the verification reference value that is the same or similar as the symmetric cryptographic algorithm that is used to generate the dynamic transaction category approval code.

30. The method of claim 4:
wherein said first generation secret value is shared with a verification server;
wherein a symmetric cryptographic algorithm is used to generate the dynamic risk level code by cryptographically combining said first risk level indicator, said first dynamic value and said first generation secret value; and
wherein another algorithm is used to generate the verification reference value that is the same or similar as the symmetric cryptographic algorithm that is used to generate the dynamic risk level approval code.

31. The method of claim 5, wherein said cryptographically combining said dynamic variable value and said cryptographic secret key is done using a symmetric cryptographic algorithm and wherein said cryptographic secret key is shared with a verification server.

32. The method of either claim 1 or claim 5, wherein the number of transaction categories is at least two and less than six.

33. The method of claim 4, wherein the number of risk levels is at least two and less than six.

34. The apparatus of claim 13, wherein the number of supported transaction category or risk level indicator values is at least two and less than six.

35. The method of any one of claim 1, 2, 3 or 4, wherein said electronic transactions comprise Internet banking transactions and wherein said criteria include criteria related to the transaction type or the amount of money involved in the transaction or the ownership of accounts involved in the transaction or the historic pattern of the user's transactions.

36. The apparatus of claim 13, wherein the dynamic approval code includes a string or sequence of human-interpretable symbols.

* * * * *

UNITED STATES PATENT AND TRADEMARK OFFICE
CERTIFICATE OF CORRECTION

PATENT NO. : 8,661,258 B2  
APPLICATION NO. : 12/604838  
DATED : February 25, 2014  
INVENTOR(S) : Frank Hoornaert et al.

Page 1 of 2

It is certified that error appears in the above-identified patent and that said Letters Patent is hereby corrected as shown below:

In the Claims

Column 15, lines 59 thru Column 16, line 12, claim 1 should read:

1. A method to secure electronic transactions comprising the steps of:
   storing, by at least on server, criteria to classify transactions into a plurality of transaction categories;
   receiving, by the at least one server, a particular electronic transaction submitted by a user, the particular electronic transaction including transaction information;
   receiving, by the at least one server, a dynamic transaction category approval code indicating a proof of intention of the user to perform a transaction belonging to a user selected transaction category;
   applying, by the at least one server, said criteria to the transaction information and assigning said received particular electronic transaction to a particular one of said plurality of transaction categories based on said criteria;
   verifying, by the at least one server, whether the received dynamic transaction category approval code is valid for the transaction category that said received particular electronic transaction was assigned to by the at least one server to determine whether the received particular electronic transaction should be executed or denied;
   wherein said dynamic transaction category approval code is generated by a token that cryptographically combines a first transaction category indicator that is indicative of the category of the transaction that the user intends to do, a first dynamic value and a first generation secret value.

(Continued)

Signed and Sealed this  
Thirty-first Day of March, 2015

Michelle K. Lee  
*Director of the United States Patent and Trademark Office*

CERTIFICATE OF CORRECTION (continued)
U.S. Pat. No. 8,661,258 B2

Column 16, line 21 through line 31, claim 3 should read:

3. The method of claim 2
wherein the method further comprises the step of determining, by the at least one server, a second transaction category indicator that is indicative of the category of said received transaction; and
wherein said generating of the verification reference value comprises cryptographically combining, by the at least one server, the second transaction category indicator indicative of the category of said received transaction, a second dynamic value and a second verification secret value.